US007899305B2

(12) United States Patent
White (10) Patent No.: US 7,899,305 B2
(45) Date of Patent: Mar. 1, 2011

(54) DIGITAL VIDEO RECORDER HAVING SKIP-TO-INTERVAL-FROM-END BUTTON

(75) Inventor: Scott White, Austin, TX (US)

(73) Assignee: AT&T Intellectual Property I, L.P., Reno, NV (US)

( * ) Notice: Subject to any disclaimer, the term of this patent is extended or adjusted under 35 U.S.C. 154(b) by 1237 days.

(21) Appl. No.: 11/199,806

(22) Filed: Aug. 9, 2005

(65) Prior Publication Data

US 2007/0036519 A1     Feb. 15, 2007

(51) Int. Cl.
*H04N 5/91* (2006.01)
(52) U.S. Cl. .................... 386/250; 386/251; 386/210
(58) Field of Classification Search .............. 386/94, 386/95, 96, 125, 126
See application file for complete search history.

(56) References Cited

U.S. PATENT DOCUMENTS

| 6,282,713 | B1 * | 8/2001 | Kitsukawa et al. ............ 725/36 |
| 7,251,413 | B2 * | 7/2007 | Dow et al. ..................... 386/46 |
| 2002/0092021 | A1 * | 7/2002 | Yap et al. ....................... 725/55 |
| 2002/0166123 | A1 * | 11/2002 | Schrader et al. .............. 725/58 |
| 2005/0097623 | A1 * | 5/2005 | Tecot et al. .................... 725/136 |
| 2005/0166258 | A1 * | 7/2005 | Vasilevsky et al. ........... 725/138 |

\* cited by examiner

*Primary Examiner* — Jamie Atala
(74) *Attorney, Agent, or Firm* — Toler Law Group (57) ABSTRACT

A user interface for a digital video recorder (DVR) comprises a graphical button that is user-selectable to cause the DVR to skip to a particular point in a program recorded by the DVR. The particular point is at a particular time interval before an end of the program. If the particular point is untagged, the graphical button has a first label when a playback position of the DVR is at a beginning of the program and a second label when the playback position of the DVR is at the end of the program. The first label differs from the second label. If the particular point is tagged, e.g. by a content owner of the program, the graphical button has a third label that differs from the first and second labels.

16 Claims, 5 Drawing Sheets

DIGITAL VIDEO RECORDER HAVING SKIP-TO-INTERVAL-FROM-END BUTTON

FIELD OF THE DISCLOSURE

The present disclosure relates to user interfaces for digital video recorders.

BACKGROUND

Many existing digital video recorders (DVRs) display a first program data screen in response to a user-initiated selection of a recorded program from a list of recorded programs. The first program data screen displays metadata information about the program, e.g. a title and a description of the program. The first program data screen also displays controls for various functions of the DVR. The controls include a start control to start playback of the recorded program or a continue control to continue playback of a stopped or paused program, a delete control to delete the recorded program from the DVR, and a protect control to protect the recorded program from being overwritten or deleted.

After the recorded program has been played to its end, a second program data screen is outputted by the DVR. The second program data screen is similar to the first program data screen but may include one or more additional or alternative controls such as a start-over control to restart playback of the recorded program from its beginning.

Currently-marketed DVRs require users to select either the start control, the continue control or the start-over control to initiate playback from a program data screen. Thereafter, the users can select a fast-forward control and/or a rewind control to navigate within the recorded program. Other navigation controls provided during playback may include a 30-second skip button, a 15-second skip back button and a commercial-skip button.

In some cases, users may be interested in fast forwarding to the last few minutes of a recorded program. Many commercial DVRs fast forward at a high speed such as 300×. The high speed of the fast forward control makes stopping a few minutes from the end of the recorded program difficult for users. If the user does not stop the fast forwarding in time, the DVR reaches the end of the recorded program and outputs the second program data screen.

BRIEF DESCRIPTION OF THE DRAWINGS

The present invention is pointed out with particularity in the appended claims. However, other features are described in the following detailed description in conjunction with the accompanying drawings in which:

DETAILED DESCRIPTION OF THE DRAWINGS

Embodiments of the present disclosure provide a digital video recorder (DVR) having a control to cause a playback position of a recorded program to be skipped to an interval from an end of the recorded program. This control assists users who wish to skip to the last few minutes of a recorded program. For example, within the do-it-yourself genre of television programs, a reveal is shown in the last few minutes. Using the control, a user can skip directly to the reveal or other important content at the end of a program. The control can be used to skip either forward to the reveal (e.g. from the beginning of the recorded program) or back to the reveal (e.g. from the end of the recorded program).

The interval may be a particular amount of time, such as five minutes, regardless of which recorded program's playback position is being skipped. In this case and other cases, the interval may be set either as a default by a manufacturer of the DVR or by a value entered by a user of the DVR.

Alternatively, some programs may have their own respective reveal positions tagged by either their content owners or their broadcasters. Each reveal position may be tagged by a respective flag that is coupled with a promotional opportunity. The promotional opportunity can be sold to an advertiser. In return, an advertisement is displayed with the reveal if the control is selected by the user.

Figure 1:
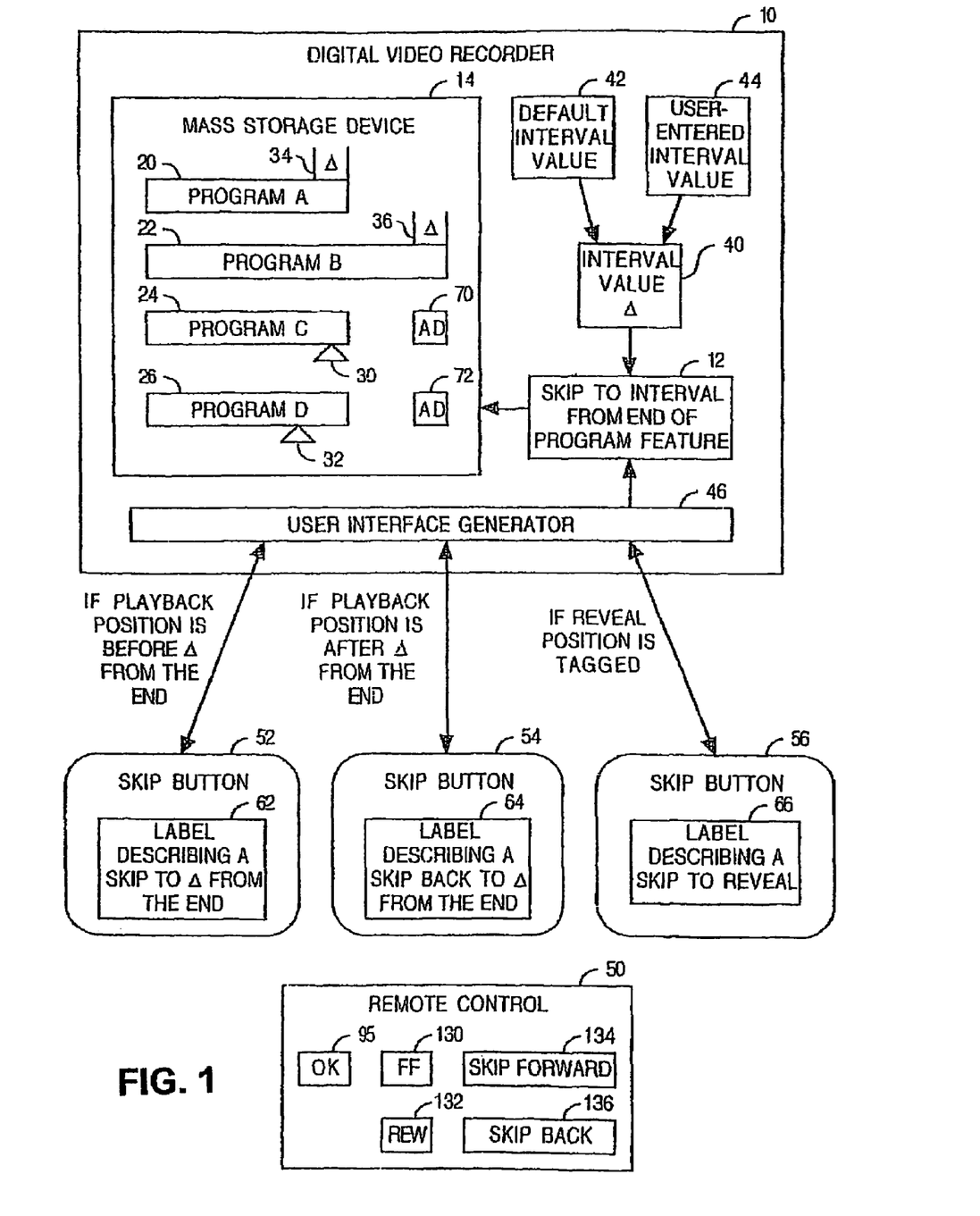
FIG. 1 is a block diagram of an embodiment of a digital video recorder having a skip-to-interval-from-end-of-program feature.

FIG. 1 is a block diagram of an embodiment of a digital video recorder (DVR) 10 having a skip-to-interval-from-end-of-program feature 12. The DVR 10 is capable of recording multiple video programs received at a user premise. The recorded video programs may comprise video-on-demand programs and/or broadcast programs. The DVR 10 may receive the video programs from a cable television service, a satellite television service, an Internet Protocol television (IPTV) service or a terrestrial over-the-air television service, for example The DVR 10 stores the recorded video programs in a mass storage device 14. The mass storage device 14 may comprise a hard disk or another computer-readable medium to store the video programs as computer-readable data. In general, the mass storage device 14 may store any number of video programs up to its storage capacity. For purposes of illustration and example, however, the mass storage device 14 in FIG. 1 is depicted as storing four different video programs 20, 22, 24 and 26. The programs 20, 24 and 26 have substantially the same time length (e.g. sixty minutes). The program 22 has a different time length (e.g. ninety minutes).

The program 24 has a reveal point 30 that is tagged by its content owner. Similarly, the program 26 has a reveal point 32 that is tagged by its content owner. The programs 24 and 26 may have either the same content owner or different content owners. As an alternative to being tagged by content owners, each reveal point may be tagged by a broadcaster of the respective program.

The reveal point 30 is included as one or more data elements embedded within the program 24. Similarly, the reveal point 32 is included as one or more data elements embedded within the program 26. In one embodiment, each reveal point is established as a respective flag within its video program. The one or more data elements can indicate the reveal point 30 or 32 in a variety of ways, examples of which include but are not limited to a specific amount of time from the beginning of the program 24 or 26, a specific amount of time from the end of the program 24 or 26, and at or about a final frame in a final commercial in the program 24 or 26 before its reveal.

The reveal point 30 can be located anywhere within the program 24, and the reveal point 32 can be located anywhere within the program 26. In general, the reveal point 30 is located a first interval of time from the end of the program 24, and the reveal point 32 is located a second interval of time from the end of the program 26. As depicted in FIG. 1, the first and second intervals may be different; for example, the first interval may be less than the second interval. Alternatively, the first and second intervals may be the same for the programs 24 and 26.

Preferably, each program tagged with a respective reveal point has one and only one respective reveal point. In this case, the reveal point 30 is the only tagged reveal point in the program 24, and the reveal point 32 is the only tagged reveal point in the program 26.

In contrast to the programs 24 and 26, the programs 20 and 22 do not have embedded reveal points. For these programs 20 and 22, the DVR 10 assigns reveal points 34 and 36, respectively, based on a stored interval value Δ 40. The reveal points 34 and 36 are located the interval of time Δ from the end of the programs 20 and 22, respectively. The interval value Δ 40 may be a default value 42 set by a manufacturer of the DVR 10. The default value 42 may be five minutes, for example. Alternatively, the interval value Δ 40 may be a user-entered value 44. An operator of the DVR 10 can enter the value 44 by analyzing typical television content that he/she views and determining when the reveal is commonly presented. The user-entered value 44 may be four minutes, for example.

The DVR 10 includes a user interface generator 46 which generates user interfaces for display by a visual display device such as a television. The user interfaces enable users to command different features of the DVR 10. Examples of the features include, but are not limited to, recording features (e.g. selecting which received programs are to be recorded and stored by the mass storage device 14), playback features (e.g. selecting one of the stored programs in the mass storage device 14 for playback, and starting playback, fast-forwarding, rewinding, pausing, continuing and/or stopping the selected program), and memory management features (e.g. either deleting or protecting recorded program data in the mass storage device 14). Some or all of the features may be commanded by user-selections made with a remote control 50 that cooperates with the DVR 10. Either alternatively or additionally, some or all of the features may be commanded by user-selections made using buttons on the DVR 10 and/or a touch screen of the visual display device.

The user interface generator 46 generates a user interface to enable users to select the skip-to-interval-from-end-of-program feature 12. The user interface comprises a graphical button 52, 54 or 56 that is user-selectable to skip to a particular point in a program recorded by the DVR 10. The graphical button 52, 54 or 56 has a label that differs based on whether or not the program has a tagged reveal position, and based on a current playback position of the program if the program is absent a tagged reveal position.

If the program is absent a tagged reveal position and the current playback position of the program is before the interval value Δ 40 from the end of the program, the button 52 has a textual label 62 describing a skip to the interval value from the end (e.g. a skip to a particular amount of time from the end). In this case, the current playback position may be at either the beginning of the program or an intermediate point in the program before the (end−Δ) point. If Δ=5 minutes, the textual label 62 may comprise either "skip to 5 minutes from end" or "skip 5 minutes from end", for example. The button 54 is user-selectable in connection with the program 20 or the program 22 to cause the DVR 10 to skip to the DVR-assigned reveal point 34 or the DVR-assigned reveal point 36, respectively.

If the program is absent a tagged reveal position and the current playback position of the program is after the interval value Δ 40 from the end of the program, the button 54 has a textual label 64 describing a skip back to the interval value from the end (e.g. a skip back of a particular amount of time from the end). In this case, the current playback position may be at either the end of the program or an intermediate point in the program after the (end −Δ) point. If Δ=5 minutes, the textual label 64 may comprise either "skip back to 5 minutes from end" or "skip back 5 minutes". The "skip back 5 minutes" label is well-suited if the current playback position is at the end of the program. The button 54 is user-selectable in connection with the program 20 or the program 22 to cause the DVR 10 to skip to the DVR-assigned reveal point 34 or the DVR-assigned reveal point 36, respectively.

If the program includes a tagged reveal point, button 56 has a textual label 66 describing a skip-to-reveal function. In some embodiments, the textual label 66 comprises "skip to reveal" or otherwise includes the word "reveal". The button 56 is user-selectable in connection with any of the tagged programs (e.g. the program 24 and the program 26) recorded by the DVR 10 to cause the DVR 10 to skip to a respective reveal point (e.g. the reveal points 30 and 32, respectively) in the program.

Additionally, the selection of the button 56 may cause the DVR 10 to augment the reveal with an advertisement. Each tagged program can have its own respective advertising opportunity associated with a skip to its reveal. For example, an advertisement 70 may be displayed with the program 24 in response to a selection of the button 56 in connection with the program 24, and a different advertisement 72 may be displayed with the program 26 in response to a selection of the button 56 in connection with the program 26. The advertisement may be displayed either before, after or simultaneously with playback of the reveal.

The button 52, 54 or 56 may be displayed as part of a program data screen that displays metadata for a program. Either alternatively or additionally, the button 52, 54 or 56 may be displayed while a recorded program is being played.

Figure 2:
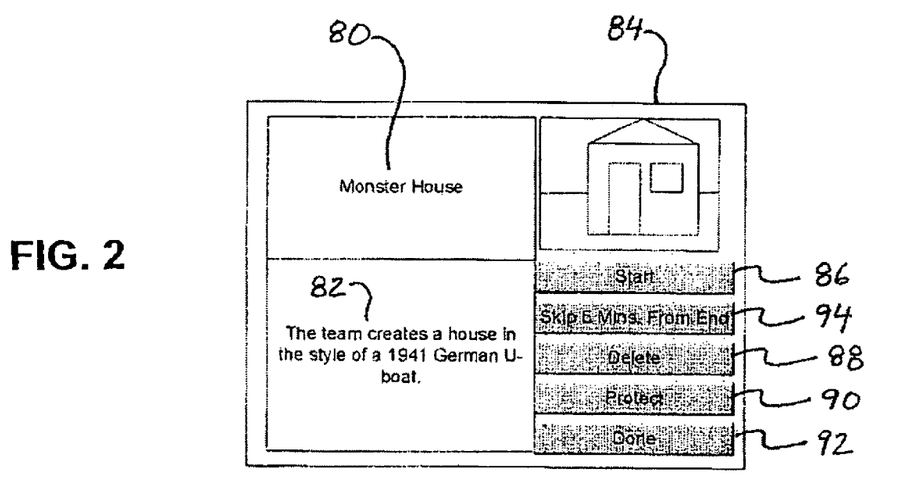
FIG. 2 is an example of a user interface having a skip-to-reveal-from-beginning function.
Figure 4:
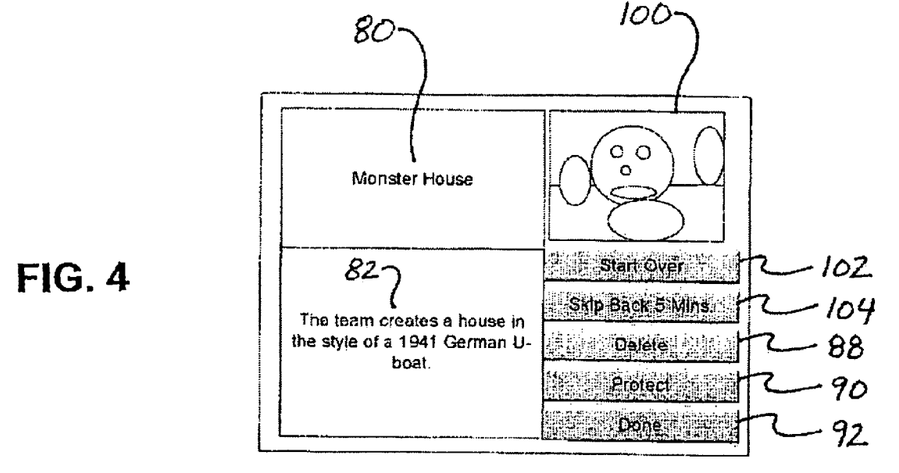
FIG. 4 is an example of a user interface having a skip-to-reveal-from-end function.
Figure 6:
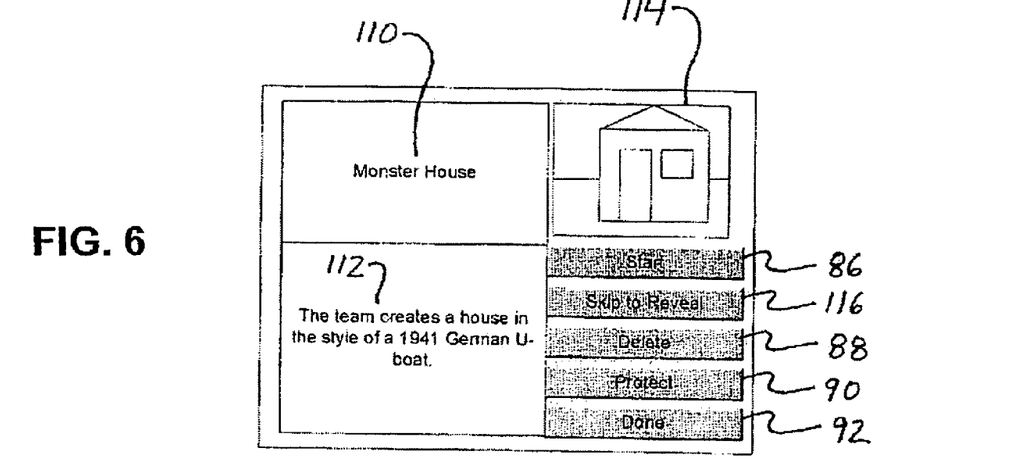
FIG. 6 is an example of a user interface having a skip-to-tagged-reveal function.

FIGS. 2, 4 and 6 show examples of user interfaces in accordance with embodiments of the button 52, 54 or 56, respectively.

FIG. 2 is an example of a user interface having a skip-to-reveal-from-beginning function. The user interface comprises a first program data screen shown before playback of a recorded program such as the program 20. The first program data screen displays a title 80 of the program 20, a description 82 of the program 20 and an image 84 from the program 20. The first program data screen includes a start button 86 that is user-selectable to start playback of the program 20, a delete button 88 that is user-selectable to delete the recorded program 20 from the DVR, a protect button 90 that is user-selectable to protect the recorded program 20 from being deleted from the DVR, and a done button 92 that is user-selectable to navigate to a different menu (e.g. to a menu of recorded programs).

The first program data screen further includes a button 94 labeled as "skip to 5 minutes from end". Consider a user who wants to watch only the last few minutes of this episode of the program 20. In this case, the user selects the button 94 to skip to a reveal point from the beginning of the program 20. The user selects the button 94 using either a remote control (e.g. by moving a cursor position to the button 94 and pressing an OK button 95 on the remote control 50), a DVR button, or a touch screen. In response to the user-selection of the button 94, the DVR starts playback of the program 20 at the reveal point 34 that is five minutes from the end.

Figure 3:
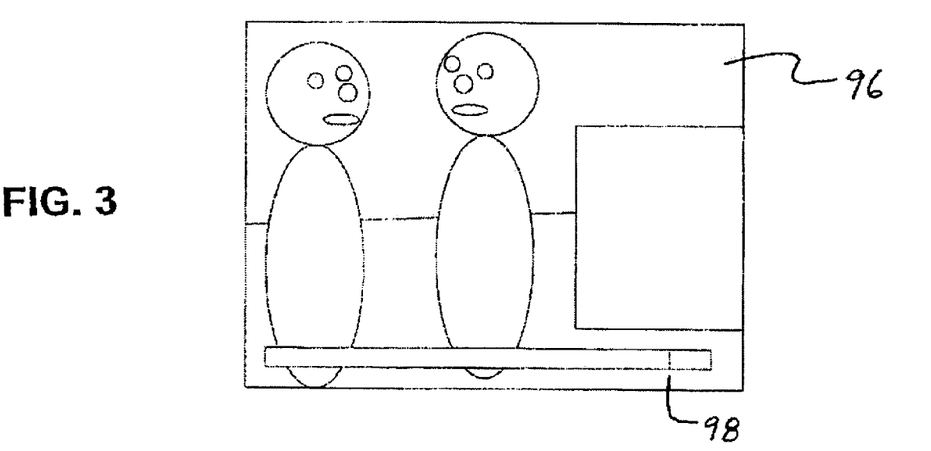
FIG. 3 shows an example of a screen displayed in response to the user-selection of the button 94. The screen includes content 96 of the program 20 starting at the reveal point 34. Optionally, the screen also includes an indicator 98 of the playback position.

FIG. 3 shows an example of a screen displayed in response to the user-selection of the button 94. The screen includes content 96 of the program 20 starting at the reveal point 34. Optionally, the screen includes also includes an indicator 98 of the playback position.

FIG. 4 is an example of a user interface having a skip-to-reveal-from-end function. The user interface comprises a second program data screen shown at the end of a recorded program such as the program 20. The second program data screen may be generated by the DVR because a user, who wants to watch only the last few minutes of this episode of the program 20, has inadvertently fast-forwarded to the end of the program 20.

The second program data screen displays the title 80 of the program 20, the description 82 of the program 20 and an image 100 from the program 20. The second program data screen includes a start-over button 102 that is user-selectable to start-over playback of the program 20 from the beginning, the delete button 88, the protect button 90, and the done button 92.

The second program data screen differs from the first program data screen by including a button 104 labeled as "skip back 5 minutes". In this case, the user selects the button 104 to skip back to the reveal point 34 of the program 20. The user selects the button 104 using either a remote control (e.g. by moving a cursor position to the button 104 and pressing the OK button 95 on the remote control 50), a DVR button, or a touch screen. In response to the user-selection of the button 104, the DVR skips back to the reveal point 34 that is five minutes from the end, and starts playback of the program 20 at that point.

Figure 5:
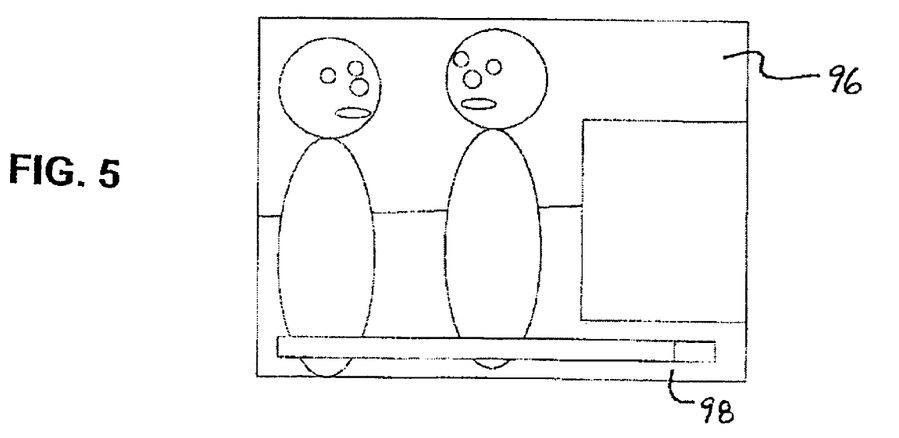
FIG. 5 shows an example of a screen displayed in response to a user-selection of a skip button having a second label.

FIG. 5 shows an example of a screen displayed in response to the user-selection of the button 104. The screen includes the content 96 of the program 20 starting at the reveal point 34. Optionally, the screen also includes the indicator 98 of the playback position.

FIG. 6 is an example of a user interface having a skip-to-tagged-reveal function. The user interface comprises a program data screen shown before playback of a tagged recorded program such as the program 24. The program data screen displays a title 110 of the program 24, a description 112 of the program 24, and an image 114 from the program 24. The program data screen includes the start button 86, the delete button 88, the protect button 90 and the done button 92.

The program data screen further includes a button 116 labeled as "skip to reveal". Consider a user who wants to watch only the reveal portion of this episode of the program 24. In this case, the user selects the button 116 to skip to the reveal point 30 that has been tagged by the content owner of the program 24. The user selects the button 116 using either a remote control (e.g. by moving a cursor position to the button 116 and pressing the OK button 95 on the remote control 50), a DVR button, or a touch screen. In response to the user-selection of the button 116, the DVR starts playback of the program 24 at the reveal point 30. The reveal point may be three minutes from the end, for example.

Figure 7:
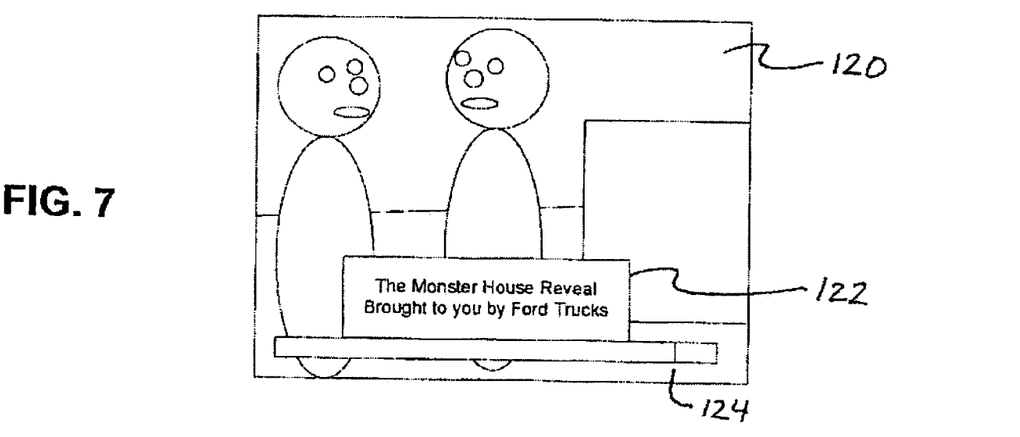
FIG. 7 shows an example of a screen displayed in response to a user-selection of a skip button having a third label.

FIG. 7 shows an example of a screen displayed in response to the user-selection of the button 116. The screen includes content 120 of the program 24 starting at the reveal point 30. The screen also includes content 122 from the advertisement 70 based on a promotional tag associated with the program 24. Optionally, the screen also includes an indicator 124 of the playback position.

Referring back to FIG. 1, the DVR 10 in one embodiment allows a user to initiate playback and/or shuttle functions from the program data screens using any of a fast forward button 130, a rewind button 132, a skip forward button 134 and a skip back button 136 on the remote control 50. In this way, the fast forward button 130 is user-selectable to cause the DVR 10 to fast forward a program directly from a program data screen (e.g. the program data screen displayed at the beginning of the program). The rewind button 132 is user-selectable to cause the DVR 10 to rewind a program directly from a program data screen (e.g. the program data screen displayed at the end of the program). The skip forward button 134 is user-selectable to cause the DVR 10 to skip forward in a program directly from a program data screen (e.g. the program data screen displayed at the beginning of the program). The skip back button 136 is user-selectable to cause the DVR 10 to skip back in a program directly from a program data screen (e.g. the program data screen displayed at the end of the program).

This feature assists users who wish to directly fast forward to, rewind to, skip forward to, or skip back to a point within the program without first starting playback of the program. For example, some users may press either the fast forward button 130 or the skip forward button 134 directly from a program data screen to skip opening credits of a program. Other users may press either the fast forward button 130 or the skip forward button 134 directly from a program data screen to navigate a few minutes into a program for which they have already seen the beginning. Still other users may press either the rewind button 132 or the skip back button 136 directly from a program data screen to re-watch an ending part of a program.

If a user, in the course of fast forwarding a program, overshoots a desired stop point and reaches the program's end, the DVR 10 displays a program data screen (e.g. the program data screen shown in FIG. 4). However, this feature enables the user to cause the DVR 10 to immediately begin rewinding toward the desired point by pressing the rewind button 132 while the program data screen is being displayed.

The herein-disclosed acts performed by the digital video recorder may be directed by a processor programmed by computer-readable program code stored by a computer-readable medium.

It will be apparent to those skilled in the art that the disclosed embodiments may be modified in numerous ways and may assume many embodiments other than the particular forms specifically set out and described herein.

Figure 8:
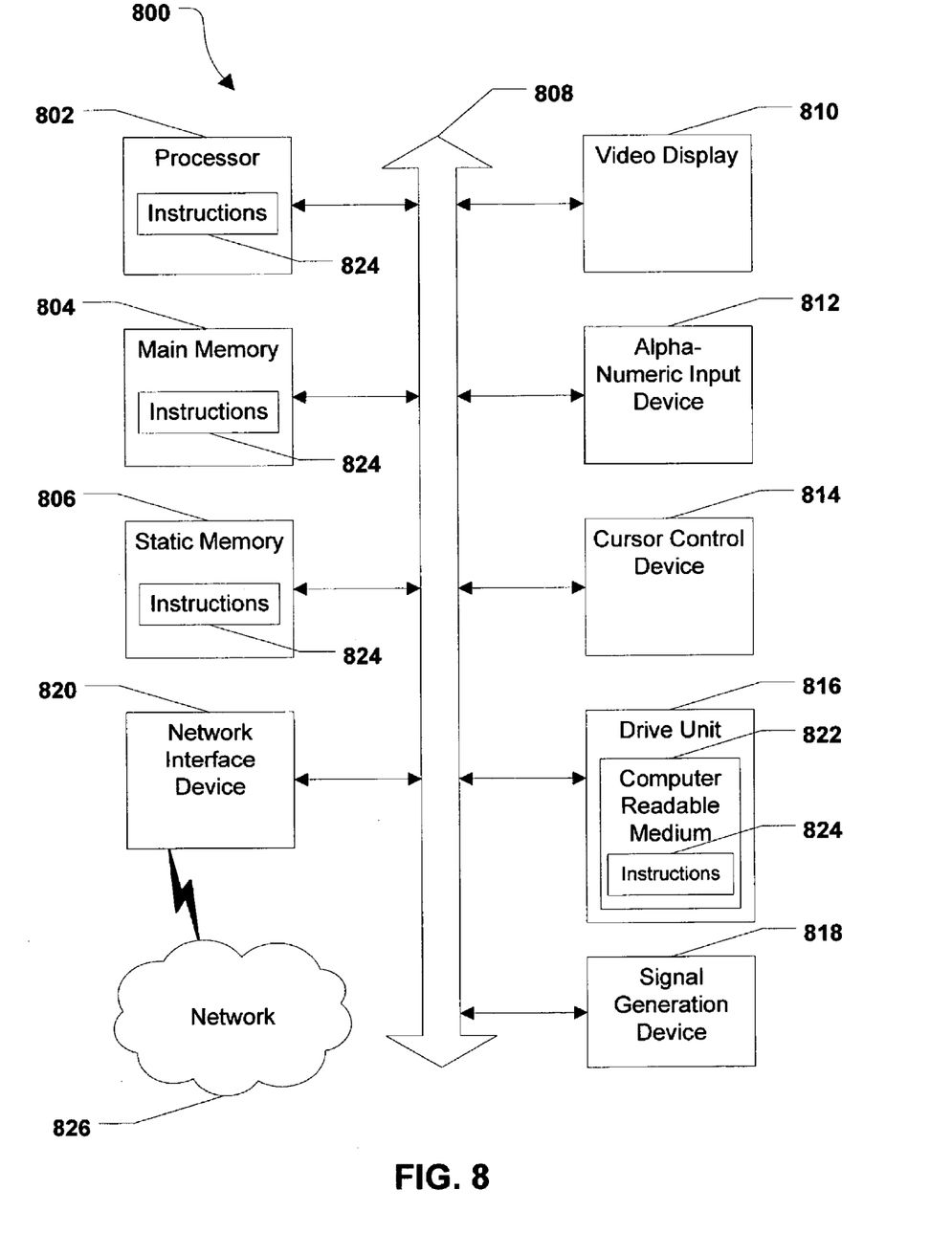
FIG. 8 is a diagram of an illustrative embodiment of a general computer system.

Referring to FIG. 8, an illustrative embodiment of a general computer system is shown and is designated 800. The computer system 800 can include a set of instructions that can be executed to cause the computer system 800 to perform any one or more of the methods or computer based functions disclosed herein. The computer system 800 may operate as a standalone device or may be connected, e.g., using a network, to other computer systems or peripheral devices.

In a networked deployment, the computer system may operate in the capacity of a server or as a client user computer in a server-client user network environment, or as a peer computer system in a peer-to-peer (or distributed) network environment. The computer system 800 can also be implemented as or incorporated into various devices, such as a personal computer (PC), a tablet PC, a set-top box (STB), a personal digital assistant (PDA), a mobile device, a palmtop computer, a laptop computer, a desktop computer, a communications device, a wireless telephone, a land-line telephone, a control system, a camera, a scanner, a facsimile machine, a printer, a pager, a personal trusted device, a web appliance, a network router, switch or bridge, or any other machine capable of executing a set of instructions (sequential or otherwise) that specify actions to be taken by that machine. In a particular embodiment, the computer system 800 can be implemented using electronic devices that provide voice, video or data communication. Further, while a single computer system 800 is illustrated, the term "system" shall also be taken to include any collection of systems or sub-systems that individually or jointly execute a set, or multiple sets, of instructions to perform one or more computer functions.

As illustrated in FIG. 8, the computer system 800 may include a processor 802, e.g., a central processing unit (CPU), a graphics processing unit (GPU), or both. Moreover, the computer system 800 can include a main memory 804 and a static memory 806, that can communicate with each other via a bus 808. As shown, the computer system 800 may further include a video display unit 810, such as a liquid crystal display (LCD), an organic light emitting diode (OLED), a flat panel display, a solid state display, or a cathode ray tube (CRT). Additionally, the computer system 800 may include an input device 812, such as a keyboard, and a cursor control device 814, such as a mouse. The computer system 800 can also include a disk drive unit 816, a signal generation device 818, such as a speaker or remote control, and a network interface device 820.

In a particular embodiment, as depicted in FIG. 8, the disk drive unit 816 may include a computer-readable medium 822 in which one or more sets of instructions 824, e.g. software, can be embedded. Further, the instructions 824 may embody one or more of the methods or logic as described herein. In a particular embodiment, the instructions 824 may reside completely, or at least partially, within the main memory 804, the static memory 806, and/or within the processor 802 during execution by the computer system 800. The main memory 804 and the processor 802 also may include computer-readable media.

In an alternative embodiment, dedicated hardware implementations, such as application specific integrated circuits, programmable logic arrays and other hardware devices, can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionality as described herein.

The present disclosure contemplates a computer-readable medium that includes instructions 824 or receives and executes instructions 824 responsive to a propagated signal, so that a device connected to a network 826 can communicate voice, video or data over the network 826. Further, the instructions 824 may be transmitted or received over the network 826 via the network interface device 820.

While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to capture carrier wave signals such as a signal communicated over a transmission medium. A digital file attachment to an e-mail or other self-contained information archive or set of archives may be considered a distribution medium that is equivalent to a tangible storage medium. Accordingly, the disclosure is considered to include any one or more of a computer-readable medium or a distribution medium and other equivalents and successor media, in which data or instructions may be stored.

Although the present specification describes components and functions that may be implemented in particular embodiments with reference to particular standards and protocols, the invention is not limited to such standards and protocols. For example, standards for Internet and other packet switched network transmission (e.g., TCP/IP, UDP/IP, HTML, HTTP) represent examples of the state of the art. Such standards are periodically superseded by faster or more efficient equivalents having essentially the same functions. Accordingly, replacement standards and protocols having the same or similar functions as those disclosed herein are considered equivalents thereof.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is provided to comply with 37 C.F.R. §1.72(b) and is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The above disclosed subject matter is to be considered illustrative, and not restrictive, and the appended claims are intended to cover all such modifications, enhancements, and other embodiments which fall within the true spirit and scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. A non-transitory computer-readable storage medium comprising instructions that, when executed by a processor, cause the processor to generate a user interface for a digital video recorder (DVR), the user interface comprising:
   a first graphical button that is user-selectable to cause the DVR to directly skip forward to a particular point in a program recorded by the DVR, the particular point at a user-defined fixed time interval before an end of the program, the first graphical button having a first textual label that describes a skip forward to the particular point at the user-defined fixed time interval before the end of the program, wherein the first graphical button is displayed when a playback position of the DVR is at a beginning of the program; and
   a second graphical button that is user-selectable to cause the DVR to directly skip back to the particular point at the user-defined fixed time interval before the end of the program, the second graphical button having a second textual label that describes a skip back to the particular point at the user-defined fixed time interval before the end of the program, wherein the second graphical button is displayed in response to the program being fast forwarded beyond the particular point at the user-defined fixed time interval before the end of the program.

2. A non-transitory computer-readable storage medium comprising instructions that, when executed by a processor, cause the processor to generate a user interface for a digital video recorder (DVR), the user interface comprising:
   a first graphical button that is user-selectable to cause the DVR to directly skip forward to a particular point in a program recorded by the DVR, the particular point at a user-defined fixed time interval before an end of the program, the first graphical button having a first textual label that describes a skip forward to the particular point at the user-defined fixed time interval before the end of the program, wherein the first graphical button is displayed when a playback position of the DVR is before the particular point at the user-defined fixed time interval before the end of the program; and
   a second graphical button that is user-selectable to cause the DVR to directly skip back to the particular point at the user-defined fixed time interval before the end of the program, the second graphical button having a second textual label that describes a skip back to the particular point at the user-defined fixed time interval before the end of the program, wherein the second graphical button is displayed in response to the program being fast forwarded beyond the particular point at the user-defined fixed time interval before the end of the program.

3. A non-transitory computer-readable storage medium comprising instructions that, when executed by a processor, cause the processor to generate a user interface for a digital video recorder (DVR), the user interface comprising:
   a skip-to-reveal button that is user-selectable to cause the DVR to directly skip to a tagged point in a program recorded by the DVR,
   wherein the DVR displays promotional content associated with the tagged point in response to selection of the skip-to-reveal button, wherein the promotional content augments content recorded by the DVR at the tagged point in the program, and wherein the promotional content is displayed before playback of the content recorded by the DVR at the tagged point in the program.

4. The non-transitory computer-readable storage medium of claim 3, wherein the tagged point is tagged by a content owner of the program.

5. The non-transitory computer-readable storage medium of claim 3, wherein the tagged point is tagged by a broadcaster of the program.

6. The non-transitory computer-readable storage medium of claim 3, wherein the promotional content includes an advertisement.

7. The non-transitory computer-readable storage medium of claim 3, wherein the program includes a plurality of tagged points, wherein different promotional content augments content recorded by the DVR at each tagged point, and wherein the promotional content associated with each tagged point is displayed before playback of the content recorded by the DVR.

8. The non-transitory computer-readable storage medium of claim 3, wherein the DVR receives the program via a cable television service.

9. The non-transitory computer-readable storage medium of claim 3, wherein the DVR receives the program via a satellite television service.

10. The non-transitory computer-readable storage medium of claim 3, wherein the DVR receives the program via an Internet Protocol (IP) television (IPTV) service.

11. The non-transitory computer-readable storage medium of claim 3, wherein the DVR receives the program via a terrestrial over-the-air television service.

12. The non-transitory computer-readable storage medium of claim 1, wherein the second graphical button is displayed in response to the program being fast forwarded to the end of the program.

13. The non-transitory computer-readable storage medium of claim 1, wherein the second graphical button is displayed in response to the program being fast forwarded to an intermediate point in the program before the end of the program and beyond the particular point at the user-defined fixed time interval before the end of the program.

14. The non-transitory computer-readable storage medium of claim 2, wherein the second graphical button is displayed in response to the program being fast forwarded to the end of the program.

15. The non-transitory computer-readable storage medium of claim 2, wherein the second graphical button is displayed in response to the program being fast forwarded to an intermediate point in the program before the end of the program and beyond the particular point at the user-defined fixed time interval before the end of the program.

16. The non-transitory computer-readable storage medium of claim 5, wherein the tagged point is associated with a final frame in a final commercial in the program.

\* \* \* \* \*